United States Patent [19]
Lee

[11] Patent Number: 5,241,727
[45] Date of Patent: Sep. 7, 1993

[54] CLIP FOR COUPLING INNER SHIELD WITH FRAME

[75] Inventor: Jaechul Lee, Kyunggi, Rep. of Korea

[73] Assignee: Samsung Electron Devices Co., Ltd., Kyunggi, Rep. of Korea

[21] Appl. No.: 798,874

[22] Filed: Nov. 25, 1991

Related U.S. Application Data

[63] Continuation of Ser. No. 632,968, Dec. 24, 1990, abandoned.

[51] Int. Cl.$^5$ .............................................. A44B 21/00
[52] U.S. Cl. ................................................ 24/453; 24/295
[58] Field of Search .................. 24/453, 458, 542, 545, 24/546, 563, 295, 294, 293, 618; 411/508, 913; 174/138 D

[56] References Cited

U.S. PATENT DOCUMENTS

| | | | |
|---|---|---|---|
| 1,767,745 | 6/1930 | Day | 24/458 X |
| 2,147,779 | 2/1939 | Van Uum | 24/295 X |
| 2,156,670 | 5/1939 | Van Uum | 24/295 |
| 2,526,532 | 10/1950 | Bedford | 24/453 |
| 2,958,914 | 11/1960 | Krach | 24/453 |

FOREIGN PATENT DOCUMENTS

| | | | |
|---|---|---|---|
| 1402266 | 5/1965 | France | 24/295 |
| 497399 | 10/1955 | Italy | 24/295 |
| 476990 | 12/1937 | United Kingdom | 24/295 |
| 884939 | 12/1961 | United Kingdom | 24/294 |

*Primary Examiner*—James R. Brittain
*Attorney, Agent, or Firm*—Christie, Parker & Hale

[57] ABSTRACT

A clip for securing an inner shield to a frame of a cathode ray tube having apertures coaxial with one another which comprises a central elastic bent portion shaped to enter the apertures; a pair of first bent side portions extending from the central elastic bent portion and shaped to seat in the apertures when the clip is inserted into the aperture; a pair of second bent side portions extending from respective ones of the first bent side portions and being divergent with respect to each other; a pair of elastic bent portions extending from respective ones of the second bent side portions and being bent outwardly and back toward the pair of first bent side portions; and a pair of elastic grasping portions extending from respective ones of the elastic bent portions essentially parallel with each other and ending at a plane transecting both of the pair of first bent side portions to engage an upper surface of the inner shield when the clip is inserted into the apertures.

4 Claims, 4 Drawing Sheets

CLIP FOR COUPLING INNER SHIELD WITH FRAME

This is a continuation of application Ser. No. 07/632,968, filed Dec. 24, 1990 now abandoned.

BACKGROUND OF THE INVENTION

1. Field of the Invention

The present invention relates to a clip for coupling an inner shield with the frame of a cathode ray tube.

2. Description of the Prior Arts

A cathode ray tube, and particularly a shadow mask type cathode ray tube is provided with a frame for installing a shadow mask, and the frame is for attaching not only the shadow mask but also an inner shield for shielding the influence of the geomagnetic field.

It is impossible to form the frame and the inner shield integrally due to their structural natures, and therefore, they are separately manufactured, the coupling of them being performed in the assembling process. A clip is required for coupling the frame and the inner shield in the assembling process, and has to satisfy the following three conditions. First, the clip should provide sufficient coupling so as to prevent the inner shield from oscillating or vibrating when external forces are applied to the shield; second, the clip should be easily manufactured; and third, the clip should be easily worked on when installed, i.e., an easy coupling of the inner shield with the frame.

As shown in FIG. 1, a conventional clip includes an elasticity providing portion A having self elasticity and formed in a V shape; a pair of shoulders S symmetrically extended outwardly in opposite directions at an angle from the elasticity providing portion A; and a pair of handles B each extended from a respective one of the shoulders S at an angle. An inner shield I is assembled with a frame F, overlying the frame F. Securing holes H are aligned with the frame F. The clips are inserted through the securing holes in such a manner that the frame and the inner shield are coupled between the elasticity providing portions A and the shoulders S.

Examples of such conventional clips are described in Japanese Patent Application Laid-open No. Sho 55-154041 and Japanese Patent Publication No. Sho 62-13787.

FIG. 2 shows a clip described in Japanese Patent Application Laid-open No. Sho 55-154041. In this device, a mask frame 26 for retaining a shadow mask (not shown) and a magnetic shield 27 for shielding from external magnetic fields are fixedly coupled by inserting elastic supporting members of a clip 20 into a hole 28 in the mask frame 26 and the magnetic shield 27. The elastic supporting members of the clip 20 have two portions formed in a V shape and extending outwardly at an angle of a juncture. The supporting member comprises a depressed portion 21 at the middle of each portion in an inwardly projected manner; a leading end portion 25 being outwardly extended to a pair of bent portions 22 having a V shape with an acute angle; and rear end portions 24 being inwardly extended toward the leading end portion 25 to a pair of bent portions 23 which bent portions 23 extend outwardly from the depressed portions 21. Such a clip is used in a color picture tube.

FIG. 3 shows a clip, described in Japanese Patent Application Laid-open No. Sho 62-13787. Such a clip is used in a shadow mask type color picture tube. A clip 30 has a V shape, and comprises a bent portion 31 and a pair of neck portions 32. The neck portions 32 are engaged in a hole 38 of a support frame 35 and a shielding member 36. First shoulder portions 33 are formed in the front of the neck portions 32, i.e., between the bent portion 31 and the neck portions 32, and second shoulder portions 34 are formed in the rear of the neck portions opposite the first shoulder portions 33. The width of the second shoulder portion 34 is larger than that of the first shoulder portion 33.

The above two examples of the prior art focused on only two of the three conditions mentioned above; they focused on whether the clip provides sufficient coupling and whether the clip is easily manufactured. The workability of the clip was disregarded.

The clips of the above examples have a gentle V shape, and are manually installed into the insertion holes. However, since the portion of the clip grasped by the worker, i.e., two free or leading end portions of the V shaped clip are sloped (i.e., inclined at an angle with respect to the surface of the frame), the clips tend to be slipped away from the hands of the worker and to be sprung off therefrom due to the elasticity of the clip, thereby causing low productivity and loss of the clips.

SUMMARY OF THE INVENTION

It is the object of the present invention to provide a clip for coupling an inner shield with a frame, which provides sufficient coupling, high productivity, and superior workability.

The concept associated with the present invention was initiated on the finding that, if the securing hole of the inner shield and the frame for inserting the clip is shaped circular, instead of rectangular as provided in the conventional structure and if the clip is shaped to fit the circular securing hole, the workability will greatly improve.

To achieve the above object, the clip for coupling the inner shield with the frame of the cathode ray tube, according to the present invention, is constituted such that it forms an approximate V shape, bent at an angle of 60–90 degrees, and further comprises: a pair of first bent portions which are formed by inwardly bending in the shape of V the extensions of a first elastic bent portion which is the ultimate corner tip of the clip and which endows the clip with elasticity at positions a certain distance from the first elastic bent portion; a pair of second bent portions which are formed by outwardly bending the extensions of the first bent portions at positions a certain distance from the corners of the first bent portions; a pair of second elastic bent portions which are formed by bending in the shape of U the extensions of the second bent portions at positions a certain distance from the corners of the second bent portions; and a pair of grasping portions which are provided in the form of downward extensions of the second elastic bent portions, the grasping portions being endowed with elasticity by the second elastic bent portions, and the inner shield and the frame being coupled between positions on inclines formed between the first bent portions and the second bent portions and the lower ends of the grasping portions.

BRIEF DESCRIPTION OF THE DRAWINGS

The above object and other advantages of the present invention will become more apparent by describing in detail the preferred embodiment of the present invention with reference to the attached drawings in which.

DESCRIPTION OF THE PREFERRED EMBODIMENTS

Figure 1:
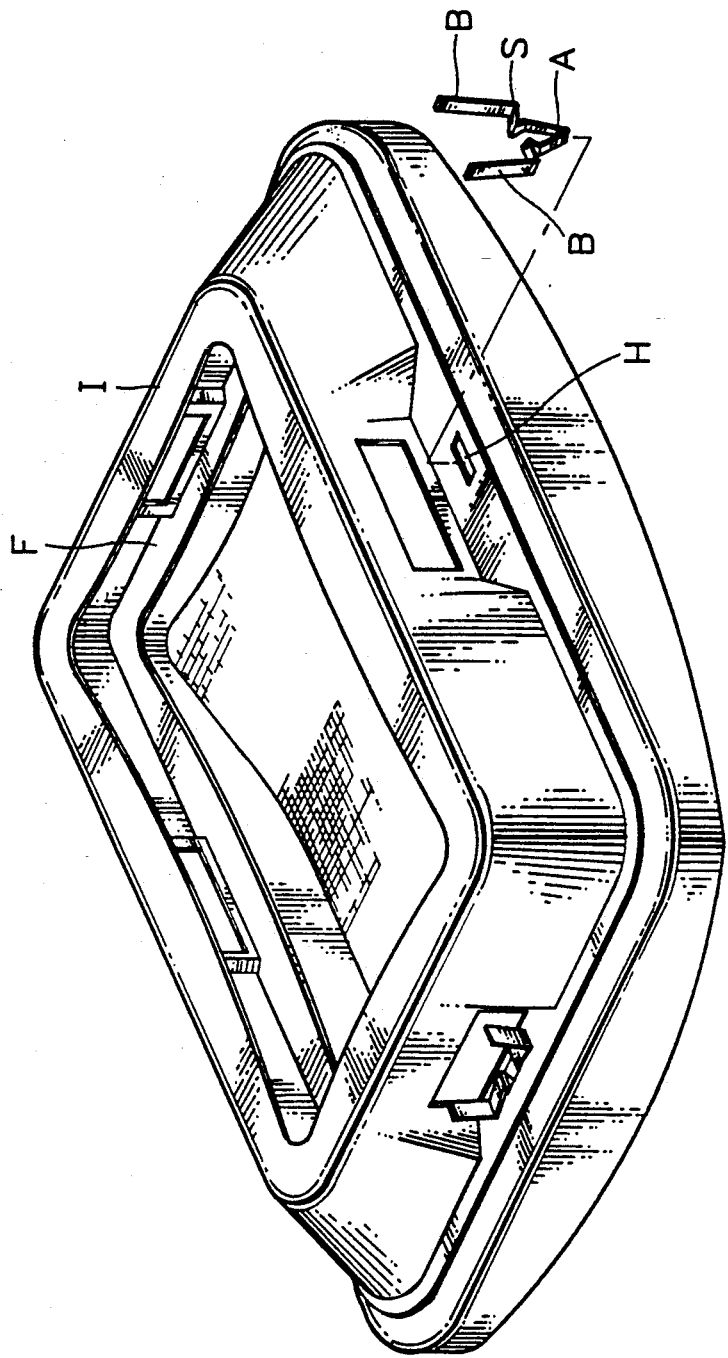
FIG. 1 is a perspective view showing a shadow mask frame and inner shield assembly having a conventional clip.
Figure 2:
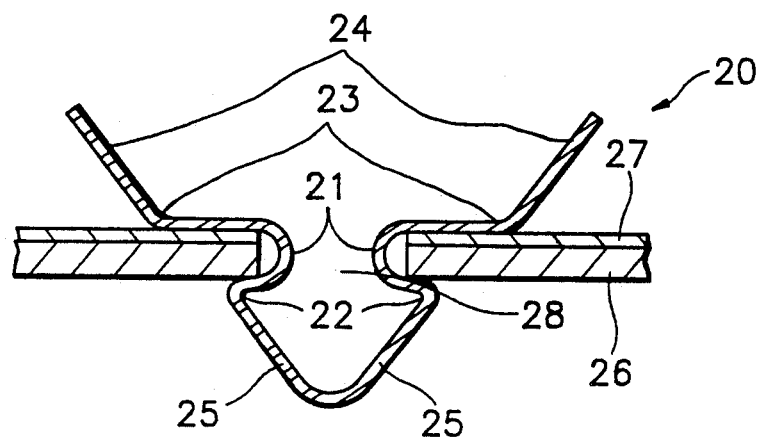
FIG. 2 is a sectional view showing the coupling between the frame and inner shield of FIG. 1 with a conventional clip.
Figure 3:
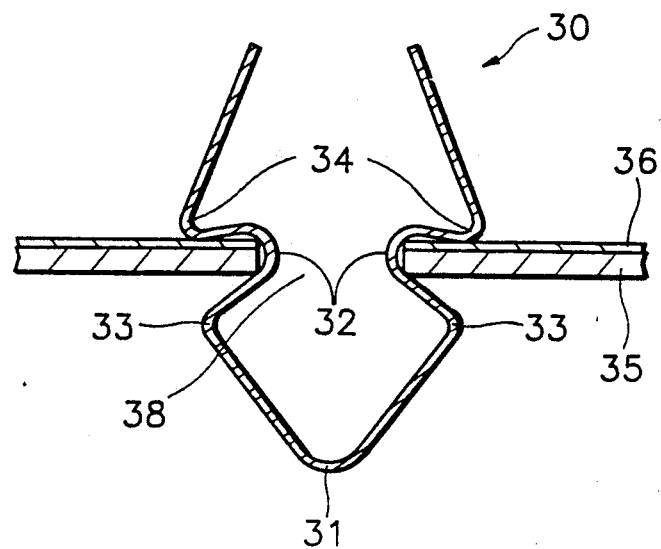
FIG. 3 is a sectional view showing the coupling between the frame and the inner shield of FIG. 1 by another conventional clip.
Figure 4:
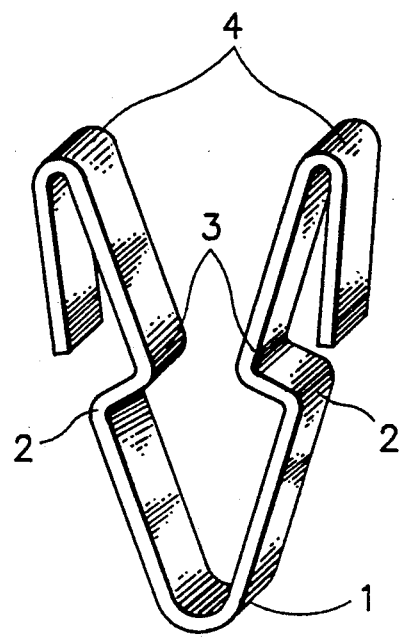
FIG. 4 is a perspective view showing an embodiment of the clip of the present invention.

FIG. 4 is a perspective view showing an embodiment of the clip of the present invention. As shown in this drawings the clip has two portions extending outwardly from a juncture in a V shape at an angle of 60 to 90 degrees, with respect to one another, thereby forming a first elastic bent portion 1 adjacent the juncture.

At a certain distance from the first elastic bent portions 1, the extending portions of the first elastic bent portions 1 of the V shaped clip are inwardly bent in a V shape thereby forming a pair of first bent portions 2. At a certain distance from the first bent portions 2, the extending portions of the first bent portions 2 are outwardly bent in a shape, thereby forming a pair of second bent portions 3. At a certain distance from the second bent portions 3, the extending portions of the second bent portions 3 are again bent in a U shape at an angle of about 180 degrees, thereby forming a pair of second elastic bent portions 4. The outer extending portion of the second elastic bent portions 4 provides grasping portions 5 to be grasped by the users. The grasping portions 5 are approximately aligned with the axis of the portions between the first elastic bent portion 1 and the first bent portions 2.

Figure 6A:
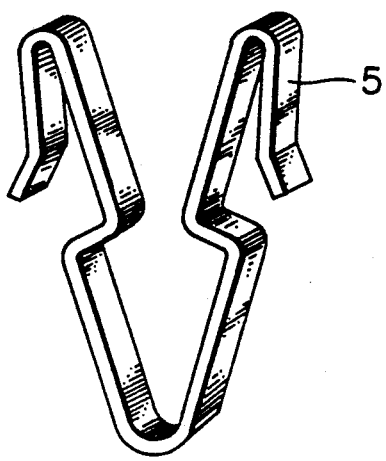
FIGS. 6a is a perspective view showing another embodiment of the clip of the present invention.
Figure 6B:
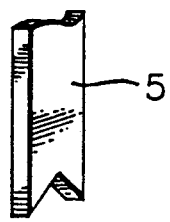
FIG. 6b is a perspective view showing an enlarged portion of the clip according to yet another embodiment of the present invention.
Figure 6C:
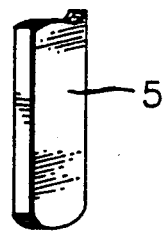
FIG. 6c is a perspective view showing an enlarged portion of the clip according to yet another embodiment of the present invention.

As shown in FIG. 6a, the middle portion of the grasping portions 5 can be further bent outwardly in a V shape to provide outwardly open recesses. The leading or free ends of the grasping portions 5 can be formed to provide a projected corner having one peak, as shown in FIG. 6c or depressed corner having two peaks, as shown in FIG. 6b.

Figure 5:
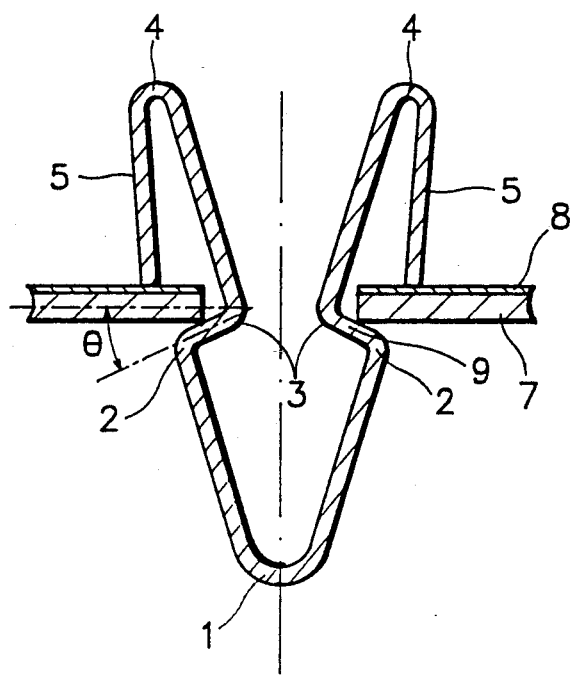
FIG. 5 is a sectional view showing the coupling between the frame and the inner shield by the clip of FIG. 4.

Referring to FIG. 5, when the clip of the present invention described above is inserted into the securing hole of a frame 7 and an inner shield 8, the lower edge portion of the securing hole of the frame 7 contacts an inclined portion 9 of the clip between the first bent portions 2 and the second bent portions 3, while the upper exposed surface of the inner shield 8 contacts the leading ends of the grasping portions 5.

The clip of the present invention provides coupling forces not only by the elastic force of the first elastic bent portion 1, but also by the elastic forces of the second elastic bent portions 4 of the clip, exerting stronger pressing coupling forces than the conventional clip. Based on a principle equally applicable to a wedge, as the smaller contacting angle 0 of FIG. 5 between the frame 7 and the inclined portions 9, the stronger the above pressing forces.

Further, the leading ends of the grasping portions 5 instead of having a flat face provides a point having one or two peaks contact, instead of a linear contact, between the leading ends of the grasping portions 5 and the upper surface of the inner shield, and therefore, the probability of the leading ends of the grasping portions 5 slipping away from the upper surface of the inner shield 8 is greatly reduced.

Further, if the middle of the grasping portions 5 are bent at a gentle angle as described above, the contact between the leading ends of the grasping portions 5 and the upper surface of the inner shield 8 is further improved, and makes it easier for the user to hold the clip. That is, as described above, the angle of the peak of the first elastic bent portion 1 of the clip according to the present invention is 60 to 90 degrees, and therefore, the clip of the present invention raises no apprehension that it might be slipped away from the hand of the users. Further, if the middle of the grasping portions 5 of the clip are gently bent, then such an apprehension is further eliminated.

As described above, the conventional clips are made to fit the rectangular securing holes. However, since the clip of the present invention is bent at an angle of 60 to 90 degrees at the peak point or juncture, it can be made to fit not only the circular securing holes but also the rectangular securing holes. When circular securing holes are used, since it requires no directional (both lateral and longitudinal) alignment, the following advantages are obtained in addition to the above advantages.

First, it will make it easier to make a punch and a die for forming the securing holes, and repair the holes.

Figure 6D:
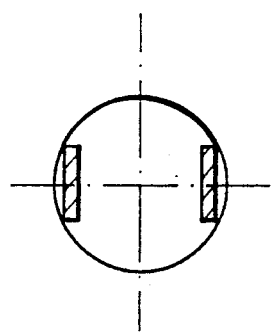
FIG. 6d is a section view showing a relative position of the clip in the circular securing hole of the frame and inner shield according to yet another embodiment of the present invention.

Second, referring to FIG. 6d, contacts between the clip and the edges of the circular securing hole of the frame are made at four points, further preventing slipping of the clip.

Third, when the clip of the present invention is inserted into the circular securing holes, the working direction, i.e., the position of the clip relative to the securing holes does not have to be fixed, improving work efficiency.

I claim:

1. A clip formed from an elongate resilient member for securing an inner shield (8) to a frame (7) of a cathode ray tube under tension, wherein the elongate member comprises:

a) a pair of first elastic bent portions (1) formed by bending the elongate member at an angle when not under tension of about 60 to 90 degrees at an apex thereof to form a V-shape;

b) a pair of first bent side portions (2) formed by bending the pair of first elastic bent portions (1) inwardly towards one another at a first predetermined spacing from the apex to form another V-shape, the first bent side portions (2) each having an inclined portion (9) extending towards each other;

c) a pair of second bent side portions (3) formed by bending the inclined portions (9) away from one another and away from the apex at a second predetermined spacing from the first bent side portions (2), the second bent side portions (3) each having a first extending portion extending away from the apex, the inclined portions (9) having a point for contacting the frame (7); and d) a pair of second elastic bent portions (4) formed by bending each first extending portion outwardly and away from each other and having a second extending portion, each second extending portion extending in respective converging directions so as to form a pair of grasping portions (5) and having free end points for contacting the surface of the inner shield, whereby the clip is adapted for fixing the inner shield (8) to the frame (7) by tension exerted due to a difference between a first length from each free end of said second elastic bent portion to a point along each of the inclined portions (9) and a second length corresponding to a distance from the second elastic bent portions to the free end points.

2. The clip of claim 1 wherein the free ends have one of a substantially linear end face and an end face comprising points for one of linear and point contact, respectively, with the inner shield.

3. A clip in combination with a frame and inner shield of a cathode ray tube, the clip being formed from an elongate resilient member for securing the inner shield (8) to the frame (7) under tension, wherein the elongate member comprises:

a) a pair of first elastic bent portions (1) formed by bending the elongate member at an angle when the clip is not under tension of about 60 to 90 degrees at an apex thereof to form a V-shape;

b) a pair of first bent side portions (2) formed by bending the pair of first elastic bent portions (1) inwardly towards one another at a first predetermined spacing from the apex to form another V-shape, the first bent side portions (2) each having an inclined portion (9) extending towards each other;

c) a pair of second bent side portions (3) formed by bending the inclined portions (9) away from one another and away from the apex at a second predetermined spacing from the first bent side portions (2), the second bent side portions (3) each having a first extending portion extending away from the apex, the inclined portions (9) having a point for contacting and in contact with the frame (7); and d) a pair of second elastic bent portions (4) formed by bending each first extending portion outwardly and away from each other and having a second extending portion, each second extending portion extending in respective converging directions toward a surface of the inner shield so as to form a pair of grasping portions (5) and having free end points for contacting the surface of the inner shield, wherein the clip is disposed for fixing the inner shield (8) to the frame (7) under tension exerted due to a difference between a first length from each second elastic bent portion to each point where the inclined portions (9) contact the frame (7), and a second length corresponding to a distance from the second elastic bent portions to the free end points, and wherein the apex angle of the first elastic bent portion is less than 60° when the clip is under tension.

4. The combination of claim 3 wherein the free ends have one of a substantially linear end face and an end face comprising points for one of linear and point contact, respectively, with the inner shield.

* * * * *